United States Patent [19]

Hashimoto

[11] Patent Number: 4,584,434
[45] Date of Patent: Apr. 22, 1986

[54] ADDITIONAL SYSTEM FOR AUTOMATIC INFORMATION RECEPTION TERMINAL DEVICE UTILIZING TELEPHONE CIRCUIT

[75] Inventor: Kazuo Hashimoto, Tokyo, Japan

[73] Assignee: Hashimoto Corporation, Tokyo, Japan

[21] Appl. No.: 646,431

[22] Filed: Aug. 31, 1984

[30] Foreign Application Priority Data

Sep. 2, 1983 [JP]  Japan ............................. 58-161705

[51] Int. Cl.⁴ ........................................... H04M 11/00
[52] U.S. Cl. ................................................. 179/2 A
[58] Field of Search ............... 179/2 A, 2 AM, 2 DP, 179/2 R, 6.07, 6.11, 6.13–6.16

[56] References Cited

U.S. PATENT DOCUMENTS 3,838,219  9/1974  Mason ........................... 179/2 A X
3,838,220  9/1974  Gormly ......................... 179/2 A X
4,345,113  8/1982  Shelley ............................. 179/2 A Primary Examiner—W. J. Brady
Attorney, Agent, or Firm—Lowe, Price, Leblanc, Becker & Shur

[57] ABSTRACT

A system is added to a terminal device for automatically responding to a ringing signal of a telephone set and receiving information. Upon reception of an incoming call, an automatic telephone answering apparatus is started to send an outgoing message to a calling party. Thereafter, in response to a remote control signal supplied from the calling party, a ringing signal generating circuit is operated to generate the same signal as the ringing signal of the telephone set. The system to be connected to the telephone circuit independently can be operated without being modified, and the terminal device is started in response to the ringing signal generating circuit, so that the terminal device is connected to the telephone circuit to receive information.

9 Claims, 2 Drawing Figures

ADDITIONAL SYSTEM FOR AUTOMATIC INFORMATION RECEPTION TERMINAL DEVICE UTILIZING TELEPHONE CIRCUIT

BACKGROUND OF THE INVENTION

The present invention relates to an additional system for a terminal device such as a facsimile system for automatically receiving information in response to an incoming call by using a public telephone circuit.

A conventional terminal device such as a facsimile system automatically responds to an incoming call, generates a tone signal from a signal generator incorporated therein, and automatically receives information. However, in this case, a calling party as a certain third party does not understand the meaning of the tone signal. At the reception side, unnecessary information is automatically received, which is inconvenient for the called party. In particular, when an undesired direct mail item is directly transmitted through a telephone line, unnecessary information is received by the called party. When such unnecessary information is received by a facsimile system, recording paper becomes wasted. In order to prevent this, a facsimile system is proposed in Japanese Patent Disclosure No. 52-122413 wherein an outgoing message is sent to a calling party upon reception of an incoming call, and an OK signal representing permission for information reception is sent to the calling party in response to a key signal supplied from the calling party, thereby starting the facsimile system.

SUMMARY OF THE INVENTION

It is a first object of the present invention to provide an additional system for an automatic information reception terminal device utilizing a telephone circuit, wherein the additional system is added to the terminal device to send out an outgoing message to a calling party.

It is a second object of the present invention to provide an additional system for an automatic information reception device utilizing a telephone circuit, wherein the additional system is added to the information reception device to automatically respond to an incoming call and cause the terminal device to operate in response to a remote signal supplied from the telephone circuit.

In order to achieve the above objects of the present invention, there is provided an additional system added to a terminal device such as a facsimile system for automatically responding to an incoming call and receiving information, the additional system comprising: an automatic telephone answering apparatus, connected in parallel with a telephone set in a public telephone circuit, for automatically responding to a ringing signal, sending out an outgoing message, and recording a voice of a calling party; a remote control circuit, connected to the public telephone circuit, for receiving and producing a remote control signal from the calling party; ringing signal generating means, responsive to an output from the remote control circuit to supply the same signal as or a signal similar to the ringing signal of the telephone set to the terminal such as the facsimile system; relay means operated in response to the output from the remote control circuit at a time delayed from a time at which the ringing signal generating means is operated, the relay means being arranged to switch an input to the terminal device such as the facsimile system from the ringing signal generating means to the public telephone circuit and disconnect the telephone answering apparatus and the telephone set from the public telephone circuit; and means for resetting the relay means, whereby the automatic telephone answering apparatus is started to send an outgoing message in response to the ringing signal upon reception of the incoming call, the remote control circuit is operated in response to the remote control signal from the calling party to cause the ringing signal generating means to operate, the terminal device such as the facsimile system is started in response to the same signal as or the signal similar to the ringing signal generated from the ringing signal generator, the relay means causes the terminal device to connect with the public telephone circuit so as to receive information, and the automatic telephone answering apparatus and the telephone set are disconnected from the public telephone circuit by the relay means. When the information transmission/reception is completed, the means for resetting the relay means is started in response to the remote circuit or by a VOX circuit to reset the relay means. The automatic telephone answering apparatus and the terminal device such as a facsimile system are also reset by resetting means incorporated therein and are ready to receive the next incoming call.

According to the present invention as described above, when an incoming call is received, the automatic telephone answering apparatus is started to send an outgoing message to the calling party. The calling party can confirm whether or not he has a wrong number. Therefore, the calling party can properly send information. In addition to this advantage, a message can be recorded in the automatic telephone answering apparatus, as needed, resulting in convenience. In addition, information transmission can be started in response to the remote signal. Therefore, unnecessary information such as direct mail will not be received, and the unnecessary information will not inconvenience the called party.

The additional system can be started by the conventionally used ringing signal of the telephone set. The terminal device such as a facsimile system need not be modified to incorporate this additional system so as to obtain the advantages described above.

DETAILED DESCRIPTION OF THE PREFERRED EMBODIMENT

Figure 1:
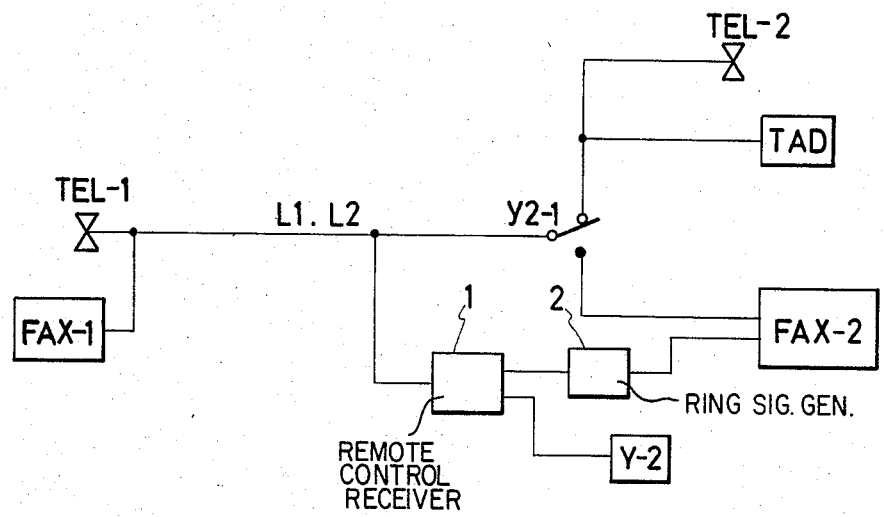
FIG. 1 is a block diagram for explaining the principle of the present invention.

FIG. 1 shows a principle of the present invention which is applied to a facsimile system as an information reception terminal. Reference symbols L1 and L2 denote telephone lines; TEL-1, a telephone set of a calling party; TEL-2, a telephone set connected to the additional system of the present invention; FAX-1 and FAX-2, facsimile systems for transmission and reception, respectively; and TAD, an automatic telephone answering apparatus. Reference numeral 1 denotes a remote control circuit for receiving a specific remote control signal from the calling party and generating a signal. Reference numeral 2 denotes a ringing signal generating means constituted by an oscillator for generating a ringing signal which has a specific standardized frequency in each country (16 Hz in Japan). The ringing signal generating means is triggered to start the facsimile system FAX-2 in response to an output from the remote control circuit 1. Reference symbol Y-2 denotes a relay which is energized within several seconds after the remote control circuit 1 triggers the ringing signal generating means 2. Reference symbol y2-1 denotes a contact of the relay Y-2.

When an incoming call is received from the telephone set TEL-1, the automatic telephone answering apparatus TAD is started. The automatic telephone answering apparatus TAD is set in the recording mode when it sends out an outgoing message and conventional beeptone; e.g., "Hashimoto Corporation. The person in charge is not in the office. If you wish to leave a message, please begin your message after the tone. If you wish to send information to us through a facsimile system, please depress buttons 0 and 3 on your telephone. Thank you." When the calling party sends a proper message e.g., "It is x o'clock x minutes. Information xx will be sent from the facsimile system", this message is recorded on the incoming message tape. The calling party also sends a remote control signal "03" from, for example, a push-phone. The remote control circuit 1 decodes the remote control signal "03" to trigger the ringing signal generating means 2. An output from the ringing signal generating means 2 triggers the facsimile system FAX-2. Within a few seconds, the relay Y-2 is energized, and the telephone lines L1 and L2 are switched from the telephone set TEL-2 and the automatic telephone answering apparatus TAD to the facsimile system FAX-2 through the contact y2-1. When the calling party sends data from the facsimile system FAX-1, the data is received by the facsimile system FAX-2. When this operation is completed, the calling party sends a predetermined remote control signal from the push-phone or hangs up the telephone, and the remote control circuit 1 and the relay y-2 are disabled, so that the telephone lines L1 and L2 are connected to the telephone set TEL-2 and the automatic telephone answering apparatus TAD through the contact y2-1, so that the additional system becomes ready for receiving the next incoming call.

The detailed arrangement of the additional system according to an embodiment of the present invention will be described.

Figure 2:
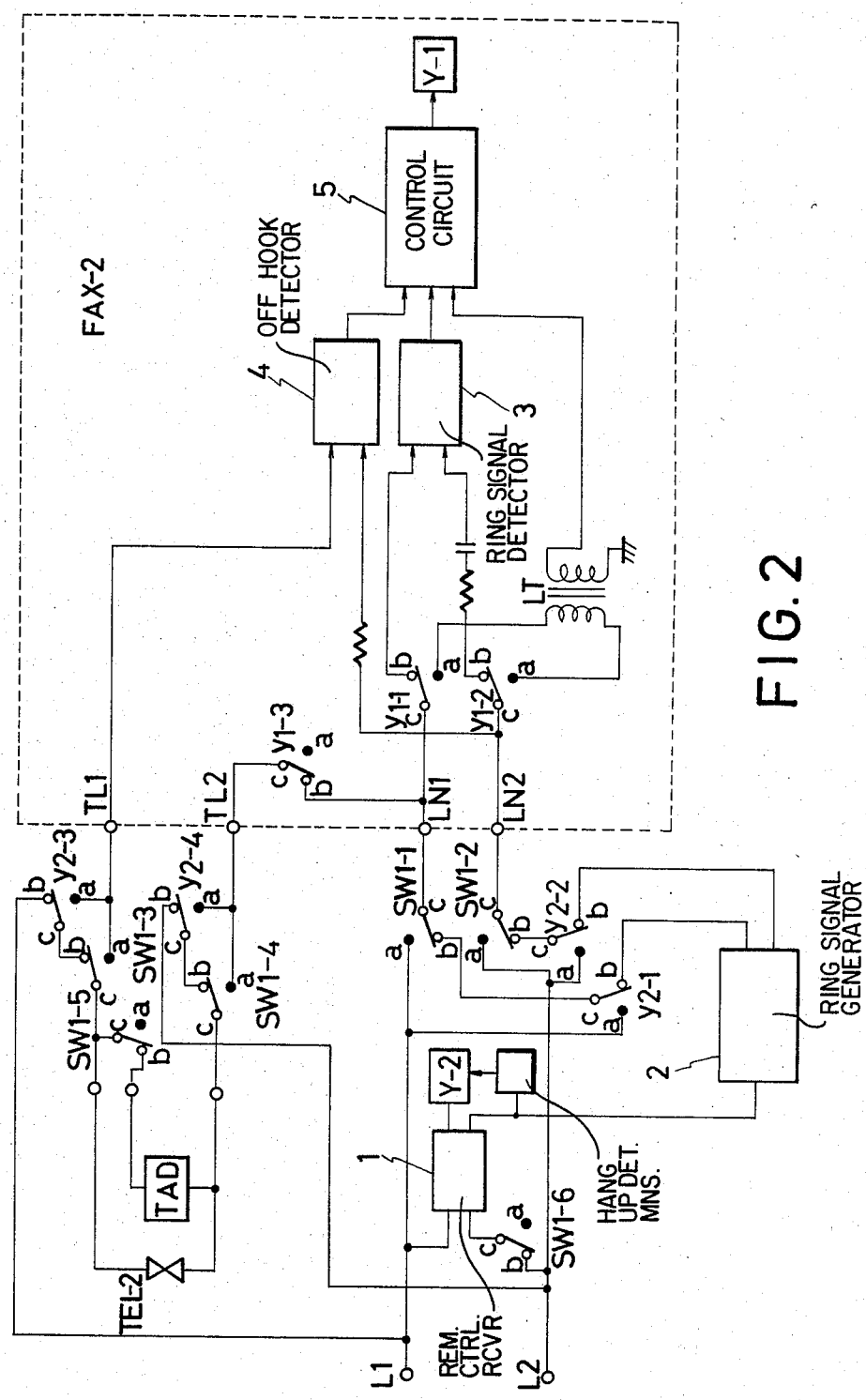
FIG. 2 is a circuit diagram of the main part of an additional system according to an embodiment of the present invention.

Referring to FIG. 2, reference symbol TEL-2 denotes the same telephone set as in FIG. 1; TAD, the same automatic telephone answering apparatus as in FIG. 1; 1, the same remote control circuit as in FIG. 1; and 2, the same ringing signal generating means as in FIG. 1, and a detailed description thereof will be omitted. Reference symbol Y-2 denotes the same relay as in FIG. 1. In practice, the relay Y-2 has contacts y2-1, y2-2, y2-3 and y2-4. Reference symbol a denotes a make contact; b, a break contact; and c, a remote control contact. Reference symbols SW1-1 to SW1-6 denote manual switches. When the switches SW1-1 to SW1-6 are set in the a positions in FIG. 2, the facsimile system FAX-2 is operated independently. However, when the switches SW1-1 to SW1-6 are set in the b positions, the facsimile system FAX-2 is started in accordance with the remote control operation after the automatic telephone answering apparatus TAD is started.

The facsimile system FAX-2 comprises a conventional facsimile system. Reference symbol LT denotes a line transformer. Reference numeral 3 denotes a photocoupler for detecting a ringing signal from a telephone station or a signal from the ringing signal generating means; 4, a photocoupler for detecting an off-hook signal from the telephone set TEL-2; and 5, a digital control circuit including a CPU for receiving outputs from the photocouplers 3 and 4 and data through the line transformer LT and performing various types of control. The digital control circuit 5 causes a relay Y-1 to energize within one or two seconds after an output from the photocoupler 3 is supplied thereto, so that the facsimile system is started. The operation described above is not directly associated with the scope of the present invention, and a detailed description thereof will be omitted.

The operation of the additional system of the present invention will be described. When the switches SW1-1 to SW1-6 are set in the b positions, as shown in FIG. 2, one side of the telephone set TEL-2 is connected to the telephone line L1 through the switch SW1-3 and the contact y2-3. The other side of the telephone set TEL-2 is connected to the telephone line L2 through the switch SW1-4 and the contact y2-4. The automatic telephone answering apparatus TAD is connected in parallel with the telephone set TEL-2 through the switch SW1-5. Terminals LN1 and LN2 of the facsimile system FAX-2 are connected to the output side of the ringing signal generating means 2 through the switch SW1-1 and the contact y2-1 and through the switch SW1-2 and the contact y2-2, respectively. The terminals LN1 and LN2 are completely disconnected from the telephone lines L1 and L2. The remote control circuit 1 is connected to the telephone lines L1 and L2 through the switch SW1-6. The input side of the remote control circuit 1 is kept at a high impedance and will not substantially act as a load of the telephone lines, so that the input side thereof may be always connected to the telephone lines L1 and L2.

When a ringing signal is supplied from the telephone set TEL-1 of the calling party to the telephone lines L1 and L2 in the connecting state described above, the telephone set TEL-2 rings, and at the same time the known automatic telephone answering apparatus TAD is started. A loop circuit of the telephone lines is formed by a known means, so that the telephone set TEL-2 stops ringing. The outgoing message is sent out from the automatic telephone answering apparatus to the caller, and the automatic telephone answering apparatus is set in the recording mode after a beep tone or special tone signal is generated asking the calling party to leave a message. The calling party records a message in the incoming message tape and sends a remote control signal (e.g., the remote control signal "03") from the push-phone. This remote control signal is decoded by the remote control circuit 1 which then generates a trigger signal from the lower output terminal of the remote control circuit 1 in FIG. 2 for triggering the ringing signal generating means 2. The ringing signal generating means 2 generates for one second the same signal (having a frequency of 16 Hz in Japan) as the ringing signal. This signal is then stopped for two seconds. The ON time of one second and the OFF time of two seconds are repeated a few times. The output signal from the ringing signal generating means 2 need not be the same as the ringing signal, but may be a similar signal thereto. It is essential for driving the photocoupler 3 for the facsimile system FAX-2. As is apparent from FIG. 2, this signal is supplied to the photocoupler 3 through the terminals LN1 and LN2 of the facsimile system FAX-2 and contacts y1-1 and y1-2 of the relay Y-1. The photocoupler 3 detects the ringing signal, and an output therefrom is supplied to the digital control circuit 5 to set the relay Y-1 in the active state. The contacts y1-1, y1-2 and y1-3 of the relay Y-1 are set in the make contacts a, the line transformer LT is connected through the contacts y1-1 and y1-2, and the photocoupler 3 is disconnected. Upon connection of the line transformer LT, the output from the ringing signal generating means 2 is short-circuited, but no failure occurs. The timer is set such that the relay Y-2 is operated ON or OFF within about one second after the relay Y-1 is operated ON or OFF, so that the contacts y2-1, y2-2, y2-3 and y2-4 of the relay Y-2 are set in the make contact a positions. The terminals LN1 and LN2 of the facsimile system FAX-2 are connected to the telephone lines L1 and L2 through the contacts y2-1 and y2-2, so that the loop is formed through the line transformer LT. On the other hand, the telephone set TEL-2 and the automatic telephone answering apparatus TAD are disconnected from the telephone lines L1 and L2 and are connected to terminals TL1 and TL2 of the facsimile system FAX-2 through the contacts y2-3 and y2-4. The telephone set TEL-2 and the automatic telephone answering apparatus TAD are completely disconnected through the contact y1-3 while the facsimile system FAX-2 is being operated. Therefore, the automatic telephone answering apparatus TAD is reset by the self timer or a built-in VOX circuit.

The data from the facsimile system FAX-1 is supplied to the facsimile system FAX-2 through the telephone lines L1 and L2 and the line transformer LT. A conventional facsimile system has a self shut-off function after transmission of data. As disclosed below, relay Y-1 will be deenergized or turned off in response to such a shut off, and soon thereafter relay Y-2 will be turned off automatically as previously mentioned. However, if the facsimile has no automatic shut off function, when the calling party sends the remote control signal "03" by the telephone set TEL-1 after he sends the data, the remote control signal is decoded by the remote control circuit 1 to cause a latch circuit or the like incorporated therein to deenergize the relay Y-2 by the upper output terminal of said remote circuit 1. On the other hand, on the side of the facsimile system FAX-2, the relay Y-2 is deenergized. When no data is received within a predetermined period of time, the relay Y-1 is deenergized to obtain the standby mode. In this case, when the telephone set TEL-2 is set in the off-hook state, the called party can talk with the calling party. The means for resetting the relay Y-2 need not comprise a remote control circuit but a VOX circuit or the like. In this case, when the data or voice from the facsimile system is interrupted for a predetermined period of time, the relay Y-2 can be reset. The relay Y-2 may be reset by a hang-up detecting means such as an instantaneous disconnection detector or a means for detecting an inversion of a polarity in a line.

When the switches SW1-1 to SW1-6 are set in the a positions, the facsimile system FAX-2 is connected to the telephone lines L1 and L2 independently, as is apparent from FIG. 2. The telephone set TEL-2 is connected to the terminals TL1 and TL2, as in the normal connection, to permit use of TEL-2 as an independent telephone set. The ringing signal from the telephone lines L1 and L2 is directly supplied to the photocoupler 3 which is then operated. The output from the photocoupler 3 drives the digital control circuit 5 which then enables the relay Y-1. The facsimile system is thus started and operates according to a particular operating program. This operation is known to those skilled in the art, and a detailed description will be omitted.

In the above embodiment, the present invention is exemplified by the addition system for a terminal device for transmitting/receiving information such as a facsimile system. However, the present invention can be applied to any other type of terminal device operated in response to a ringing signal (16 Hz) supplied from the telephone circuit.

What is claimed is:

1. An additional system for an automatic information reception terminal device utilizing a telephone circuit, comprising:
    an automatic telephone answering apparatus connected in parallel with a telephone set connected to a public telephone circuit;
    a remote control circuit, connected to said public telephone circuit, for receiving a remote control signal and generating an output;
    ringing signal generating means, operated in response to the output from said remote control circuit, for generating and supplying to said terminal device a signal identical or similar to a telephone ringing signal;
    relay means reponsive to the output from said remote control circuit, and for switching an input supplied to said terminal device from said ringing signal generating means to said public telephone circuit and disconnected said automatic telephone answering device from said public telephone circuit; and
    means for resetting said relay means.

2. A system according to claim 1, wherein said terminal device comprises a facsimile system.

3. A system according to claim 1 wherein said means for resetting said relay means comprises hang-up detecting means for detecting hang-up by a calling party.

4. A system according to claim 2 wherein said means for resetting said relay means comprises hang-up detecting means for detecting hang-up by a calling party.

5. A system according to claim 1, wherein said means for resetting said relay means comprises a latch circuit operated in response to a second occurrence of a remote control signal.

6. A system according to claim 2, wherein said means for resetting said relay means comprises a latch circuit operated in response to a second occurrence of a remote control signal.

7. A system according to claim 1, wherein the remote control signal comprises a predetermined signal or a signal equivalent thereto which is generated by depressing at least one button on a push-phone.

8. A system according to claim 2, wherein the remote control signal comprises a predetermined signal or a signal equivalent thereto which is generated by depressing at least one button on a push-phone.

9. A system according to claim 2, wherein said means for resetting said relay means comprises an interruption means responsive to an interruption in an incoming signal.

* * * * *